US011001371B2

(12) United States Patent
Bowers et al.

(10) Patent No.: US 11,001,371 B2
(45) Date of Patent: May 11, 2021

(54) HYDRAULIC DROOP CONTROL FOR AIRCRAFT WING

(71) Applicant: The Boeing Company, Chicago, IL (US)

(72) Inventors: Bret Alan Bowers, Langley, WA (US); Lisa Schleuter, Everett, WA (US)

(73) Assignee: The Boeing Company, Chicago, IL (US)

(*) Notice: Subject to any disclaimer, the term of this patent is extended or adjusted under 35 U.S.C. 154(b) by 408 days.

(21) Appl. No.: 16/057,511

(22) Filed: Aug. 7, 2018

(65) Prior Publication Data

US 2020/0047874 A1 Feb. 13, 2020

(51) Int. Cl.
| | | |
|---|---|---|
| *B64C 13/40* | (2006.01) | |
| *B64C 3/50* | (2006.01) | |
| *B64C 9/04* | (2006.01) | |
| *B64C 9/20* | (2006.01) | |
| *F15B 11/22* | (2006.01) | |
| *F15B 13/06* | (2006.01) | |
| *F15B 15/06* | (2006.01) | |
| *F15B 15/14* | (2006.01) | |

(52) U.S. Cl.
CPC ............... *B64C 13/40* (2013.01); *B64C 3/50* (2013.01); *B64C 9/04* (2013.01); *B64C 9/20* (2013.01); *F15B 11/22* (2013.01); *F15B 13/06* (2013.01); *F15B 15/06* (2013.01); *F15B 15/1409* (2013.01); *F15B 2211/7052* (2013.01); *F15B 2211/7121* (2013.01)

(58) Field of Classification Search
CPC ....... B64C 3/50; B64C 9/04; B64C 2009/143; B64C 9/16; B64C 9/20; B64C 9/02; F15B 11/025; F15B 11/22; F15B 13/06; F15B 15/06; F15B 15/1409; F15B 2211/7052; F15B 2211/7121; Y02T 50/30
See application file for complete search history.

(56) References Cited

U.S. PATENT DOCUMENTS

| | | | | |
|---|---|---|---|---|
| 2,684,215 | A | * | 7/1954 | Ashkenas ............. B64C 13/345 244/223 |
| 2,836,380 | A | * | 5/1958 | Pearson .................... B64C 9/16 244/216 |
| 3,874,617 | A | * | 4/1975 | Johnson .................... B64C 9/16 244/216 |
| 4,120,470 | A | * | 10/1978 | Whitener .................. B64C 9/20 244/213 |

(Continued)

OTHER PUBLICATIONS

What do Slave & Master Cylinders Do? https://www.sparebox.com/au/blog/slave-master-cylinders; Aug. 1, 2018.

*Primary Examiner* — Medhat Badawi
(74) *Attorney, Agent, or Firm* — Duft & Bornsen, PC

(57) ABSTRACT

Systems and methods for hydraulic droop control of an aircraft wing. One embodiment is a hydraulic droop panel system for an aircraft wing. The hydraulic droop panel system includes a first hydraulic actuator attached to a flap of the aircraft wing, and a second hydraulic actuator attached to a droop panel of the aircraft wing and fluidly coupled with the first hydraulic actuator. The second hydraulic actuator is configured to move the droop panel to a droop position corresponding with movement of the flap and the first hydraulic actuator.

20 Claims, 8 Drawing Sheets

(56) References Cited

U.S. PATENT DOCUMENTS

| | | | | |
|---|---|---|---|---|
| 4,533,096 A * | 8/1985 | Baker | B64C 13/30 | 244/75.1 |
| 4,717,097 A * | 1/1988 | Sepstrup | B64C 9/323 | 244/217 |
| 4,784,355 A * | 11/1988 | Brine | B64C 9/16 | 244/213 |
| 5,370,011 A * | 12/1994 | Gilges | F16H 25/20 | 192/143 |
| 6,802,475 B2 * | 10/2004 | Davies | B64C 13/32 | 244/99.2 |
| 7,338,018 B2 * | 3/2008 | Huynh | B64C 9/16 | 244/215 |
| 7,464,896 B2 * | 12/2008 | Carl | B64C 13/341 | 244/99.2 |
| 7,475,854 B2 * | 1/2009 | Lacy | B64C 9/16 | 244/212 |
| 7,708,231 B2 * | 5/2010 | Lacy | B64C 9/18 | 244/211 |
| 7,766,282 B2 * | 8/2010 | Kordel | B64C 9/16 | 244/215 |
| 8,070,106 B2 * | 12/2011 | Engelbrecht | B64C 9/16 | 244/215 |
| 8,556,214 B2 * | 10/2013 | McAlinden | B64C 7/00 | 244/130 |
| 9,139,286 B2 * | 9/2015 | Parker | B64C 9/34 | |
| 9,296,464 B1 * | 3/2016 | Tuohimaa | B64C 1/1407 | |
| 9,567,066 B2 * | 2/2017 | Guida | B64C 13/16 | |
| 10,112,658 B2 * | 10/2018 | Yoon | B62D 35/007 | |
| 2004/0004162 A1 * | 1/2004 | Beyer | B64C 9/18 | 244/216 |
| 2004/0046087 A1 * | 3/2004 | Beyer | B64C 3/48 | 244/219 |
| 2004/0075020 A1 * | 4/2004 | Trikha | B64C 13/505 | 244/99.4 |
| 2004/0245386 A1 * | 12/2004 | Huynh | B64D 45/0005 | 244/99.5 |
| 2005/0011994 A1 * | 1/2005 | Sakurai | B64C 9/16 | 244/212 |
| 2005/0151028 A1 * | 7/2005 | Pohl | B64C 13/26 | 244/213 |
| 2006/0000952 A1 * | 1/2006 | Rampton | B64C 9/22 | 244/214 |
| 2006/0049308 A1 * | 3/2006 | Good | B64C 13/26 | 244/76 A |
| 2006/0102803 A1 * | 5/2006 | Wheaton | B64C 9/22 | 244/214 |
| 2006/0202089 A1 * | 9/2006 | Reckzeh | B64C 9/20 | 244/215 |
| 2006/0226297 A1 * | 10/2006 | Perez-Sanchez | B64C 9/18 | 244/216 |
| 2006/0245882 A1 * | 11/2006 | Khan | B65F 3/06 | 414/525.5 |
| 2006/0284022 A1 * | 12/2006 | Harrigan | B64C 9/146 | 244/203 |
| 2007/0018040 A1 * | 1/2007 | Wingett | B64C 13/42 | 244/99.4 |
| 2007/0034748 A1 * | 2/2007 | Sakurai | B64C 9/16 | 244/215 |
| 2007/0108343 A1 * | 5/2007 | Wingett | B64C 13/341 | 244/99.3 |
| 2007/0145180 A1 * | 6/2007 | Johnson | B64C 13/50 | 244/13 |
| 2007/0176051 A1 * | 8/2007 | Good | B64C 9/32 | 244/215 |
| 2007/0252040 A1 * | 11/2007 | Kordel | B64C 7/00 | 244/123.1 |
| 2008/0202269 A1 * | 8/2008 | Yamakawa | B62D 5/008 | 74/422 |
| 2010/0089053 A1 * | 4/2010 | Hanlon | B64C 27/64 | 60/545 |
| 2010/0100355 A1 * | 4/2010 | Marx | B64D 45/0005 | 702/183 |
| 2010/0320332 A1 * | 12/2010 | Voss | B64C 9/32 | 244/217 |
| 2011/0290945 A1 * | 12/2011 | Peirce | B64C 9/22 | 244/213 |
| 2012/0292452 A1 * | 11/2012 | Parker | B64C 9/16 | 244/203 |
| 2013/0261852 A1 * | 10/2013 | Recksiek | B64C 13/30 | 701/3 |
| 2013/0320151 A1 * | 12/2013 | Kordel | B64C 9/16 | 244/215 |
| 2014/0145039 A1 * | 5/2014 | Beyer | B64C 9/10 | 244/215 |
| 2015/0097087 A1 * | 4/2015 | Sakurai | B64C 3/40 | 244/201 |
| 2015/0360369 A1 * | 12/2015 | Ishikawa | B25J 9/1674 | 29/428 |
| 2016/0046375 A1 * | 2/2016 | McNair | B64C 9/32 | 244/45 A |
| 2018/0002028 A1 * | 1/2018 | Polcuch | F15B 11/024 | |
| 2018/0156293 A1 * | 6/2018 | Fox | F16F 7/1022 | |
| 2018/0346137 A1 * | 12/2018 | West | B64D 27/26 | |
| 2019/0127044 A1 * | 5/2019 | Sakurai | B64C 9/02 | |
| 2019/0283863 A1 * | 9/2019 | Bowers | B64C 9/16 | |
| 2019/0291851 A1 * | 9/2019 | Wagner | B64C 9/20 | |
| 2019/0315449 A1 * | 10/2019 | Bowers | B64C 13/16 | |
| 2019/0322349 A1 * | 10/2019 | Tsai | B64C 3/50 | |
| 2019/0359314 A1 * | 11/2019 | Tsai | B64C 9/10 | |
| 2020/0031453 A1 * | 1/2020 | Tsai | B64C 9/02 | |
| 2020/0047874 A1 * | 2/2020 | Bowers | B64C 3/50 | |
| 2020/0055585 A1 * | 2/2020 | Hung | B64C 39/024 | |
| 2020/0156764 A1 * | 5/2020 | Tzabari | B64C 9/02 | |
| 2020/0156766 A1 * | 5/2020 | Tzabari | B64C 9/02 | |
| 2020/0180750 A1 * | 6/2020 | Tsai | B64C 13/28 | |

\* cited by examiner

HYDRAULIC DROOP CONTROL FOR AIRCRAFT WING

FIELD

The disclosure relates to the field of aircraft, and in particular, to aircraft flight control surfaces.

BACKGROUND

Aircraft wings include flight control surfaces that change the shape of the wing surface to help maneuver the aircraft during various phases of flight. For example, trailing edge flaps may be extended to increase lift. Additionally, spoilers in front of the trailing edge flaps may be actuated to control speed and descent. Some aircrafts use a drooped spoiler configuration in which a spoiler and a trailing edge flap are mechanically linked together to provide high lift at low-speeds for take-off and landing. However, the mechanical links are long and take up a large amount of integration space in the wing.

SUMMARY

Embodiments described herein provide hydraulic droop control for an aircraft wing. A flap and a spoiler of an aircraft wing are fluidly coupled via a closed hydraulic system. A first hydraulic actuator is attached to the flap of the wing and a second hydraulic actuator is attached to the droop panel of the wing. The first hydraulic actuator and the second hydraulic actuator are fluidly coupled with a hydraulic line to provide synchronized movement of the flap to droop the spoiler. In particular, as the flap is moved by pilot control, the spoiler is correspondingly drooped via the closed hydraulic system. Since the droop of the spoiler is controlled via a hydraulic fluid link rather than a series of mechanical links, cove integration space may be reduced or used more efficiently and airflow around the wing is improved.

One embodiment is a hydraulic droop panel system for an aircraft wing. The hydraulic droop panel system includes a first hydraulic actuator attached to a flap of the aircraft wing, and a second hydraulic actuator attached to a droop panel of the aircraft wing and fluidly coupled with the first hydraulic actuator. The second hydraulic actuator is configured to move the droop panel to a droop position corresponding with movement of the flap and the first hydraulic actuator.

Another embodiment is a method for controlling a droop position of an aircraft wing. The method includes mechanically coupling a first hydraulic actuator to a flap of the aircraft wing, mechanically coupling a second hydraulic actuator to a droop panel of the aircraft wing, and fluidly coupling the second hydraulic actuator and the first hydraulic actuator with hydraulic fluid. The method further includes moving the flap to drive the first hydraulic actuator and force the hydraulic fluid from the first hydraulic actuator to the second hydraulic actuator, the force of the hydraulic fluid causing the second hydraulic actuator to move the droop panel to a droop position corresponding with movement of the flap and the first hydraulic actuator.

Yet another embodiment is a wing of an aircraft. The wing includes a flap configured to move via a mechanical actuator, and a spoiler. The wing further includes a hydraulic linkage between the flap and the spoiler configured to translate movement of the flap into a rotation of the spoiler about a hinge.

Other exemplary embodiments may be described below. The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
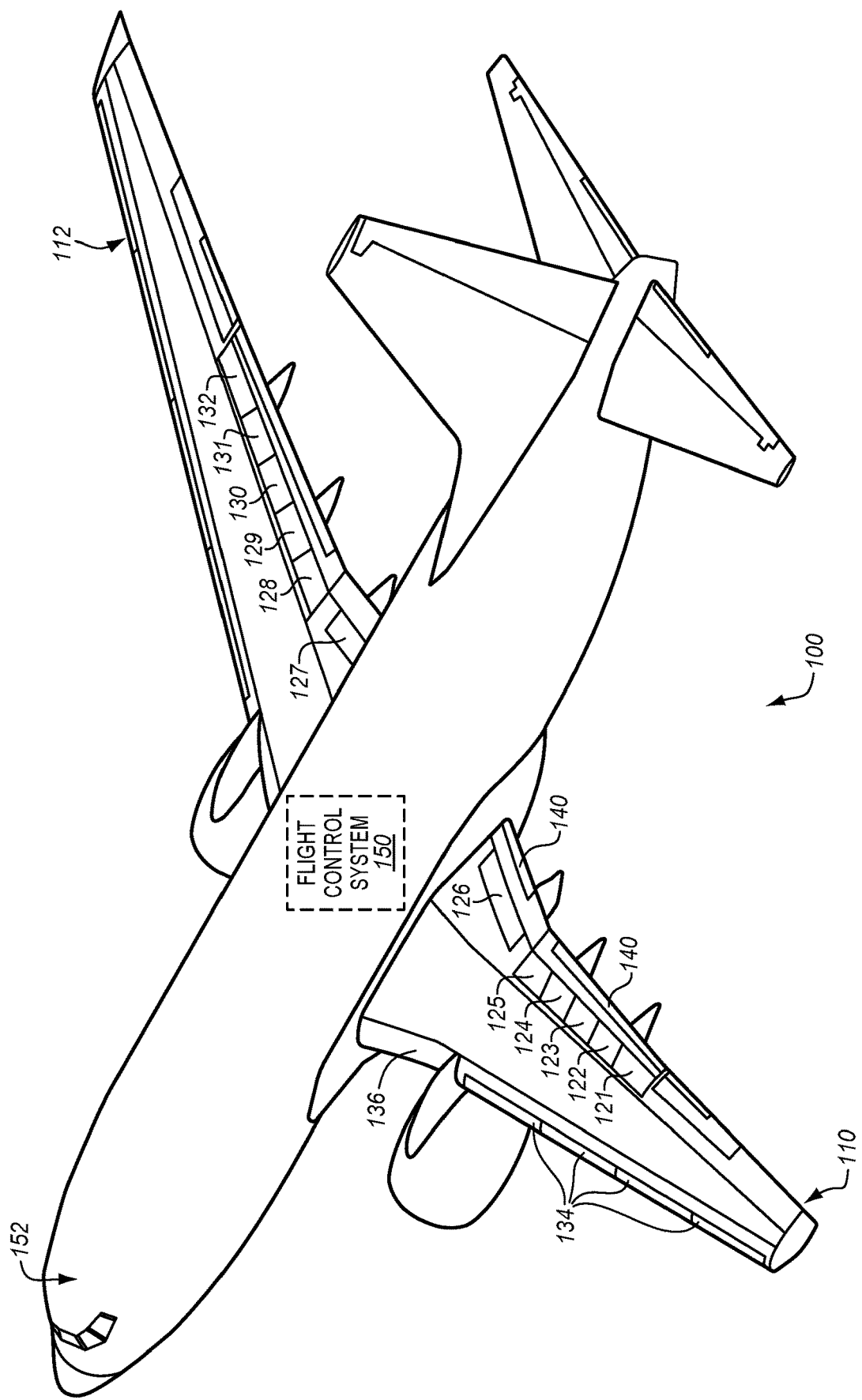
FIG. 1 illustrates an aircraft including wings with flight control surfaces.

FIG. 1 illustrates an aircraft 100 including wings 110-112 with flight control surfaces. In particular, the wings 110-112 include spoilers 121-132, leading edge slats 134, leading edge flaps 136, and trailing edge flaps 140. A flight control system 150 which may include any combination of electrical, mechanical, and hydraulic systems and components, is configured to actuate the flight control surfaces via controls operated by a pilot in a cockpit 152 of the aircraft 100.

Figure 2A:
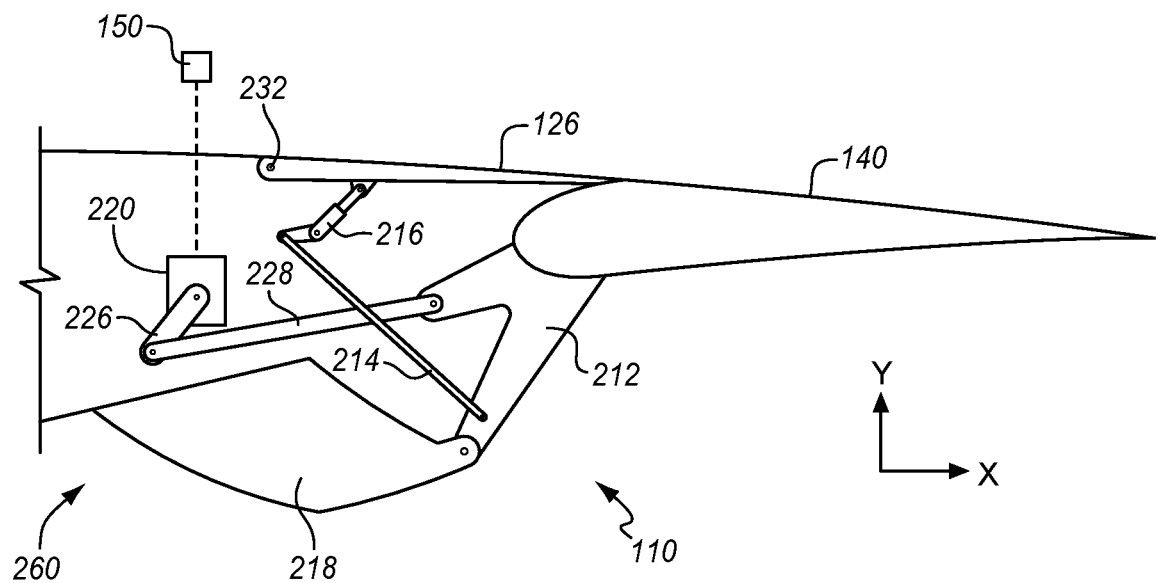
FIG. 2A is a cross-section side view of a wing with a drooped panel configuration in a stowed position.
Figure 2B:
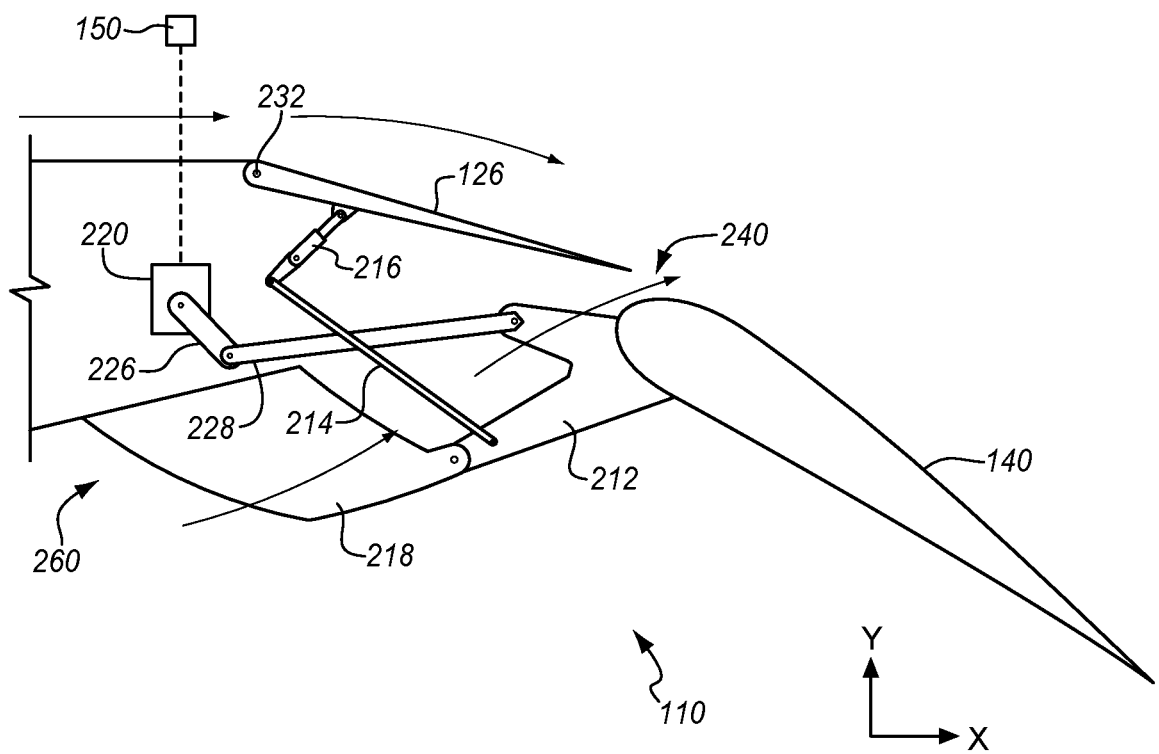
FIG. 2B is a cross-section side view of the wing with a drooped panel configuration in a deployed position.

The aircraft 100 may employ a drooped panel configuration in the wings 110-112 in which a droop panel (e.g., spoiler 126) droops downwardly while a flap (e.g., trailing edge flap 140) extends outwardly, thus improving airflow around the wing for takeoff and landing. FIG. 2A is a cross-section side view of the wing 110 with a drooped panel configuration in a stowed position. FIG. 2B is a cross-section side view of the wing 110 with a drooped panel configuration in a deployed position. Generally, the wing 110 takes the stowed position shown in FIG. 2A for cruising at altitude and takes the deployed position shown in FIG. 2B to provide lift for landing and/or takeoff of the aircraft 100.

As further shown in FIGS. 2A-2B, the spoiler 126 is mechanically linked with the trailing edge flap 140 via a plurality of mechanical members 212-216 including a flap link 212, a connecting bar 214, and a joint assembly 216. The trailing edge flap 140 is attached to the wing 110 via the flap link 212 and a support member 218 and is extended/retracted by a drive mechanism 220 responding to pilot command input to the flight control system 150. The drive mechanism 220 is mechanically linked to the trailing edge flap 140 via the flap link 212 and drive bars 226-228. Thus, in response to pilot control of the flight control system 150, the trailing edge flap 140 is moved by the drive mechanism 220 from the stowed/retracted position shown in FIG. 2A to the deployed/extended position shown in FIG. 2B.

Additionally, movement of the trailing edge flap 140 causes the spoiler 126 to change its droop position. In particular, as the trailing edge flap 140 extends outwardly (e.g., in an X direction toward rear of the aircraft 100), the spoiler 126 rotates downwardly about a hinge 232 via the translated movement of the mechanical members 212-216. Additionally, relative movement of the trailing edge flap 140 and the spoiler 126 creates a slot 240 therebetween. Thus, desirable airflow (indicated by arrows in FIG. 2B) in and around the wing 110 may be achieved for takeoff and landing.

However, the mechanical members 212-216 that enable droop of the spoiler 126 are often designed with long lengths to convert a large amount of travel of the trailing edge flap 140 to a small amount of rotation of the spoiler 126. As such, the mechanical members 212-216 may extend into a cove integration space 260 of the wing 110, potentially limiting component design/space in the wing 110 and disrupting airflow in the slot 240 between the spoiler 126 and the trailing edge flap 140. Additionally, the mechanical members 212-216 may add weight to the wing 110 and include a number of complex mechanical joints to be meticulously monitored and maintained. Though a particular configuration of the wing 110 is shown and described with respect to FIGS. 2A-2B for purposes of discussion, it will be appreciated that embodiments described below may apply to alternative aircrafts, wings, and droop panel configurations.

Figure 3A:
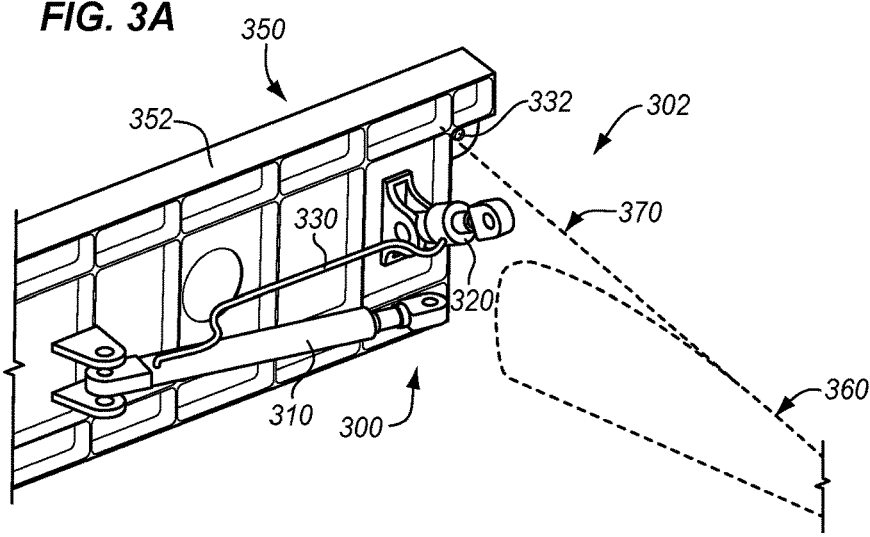
FIG. 3A illustrates a hydraulic droop panel system and a wing in a stowed position in an illustrative embodiment.
Figure 3B:
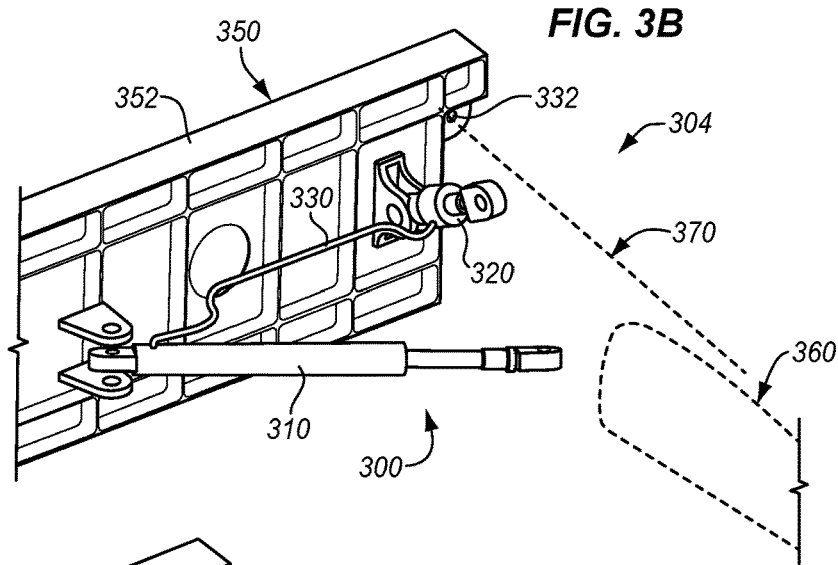
FIG. 3B illustrates a hydraulic droop panel system and a wing in an intermediate position in an illustrative embodiment.
Figure 3C:
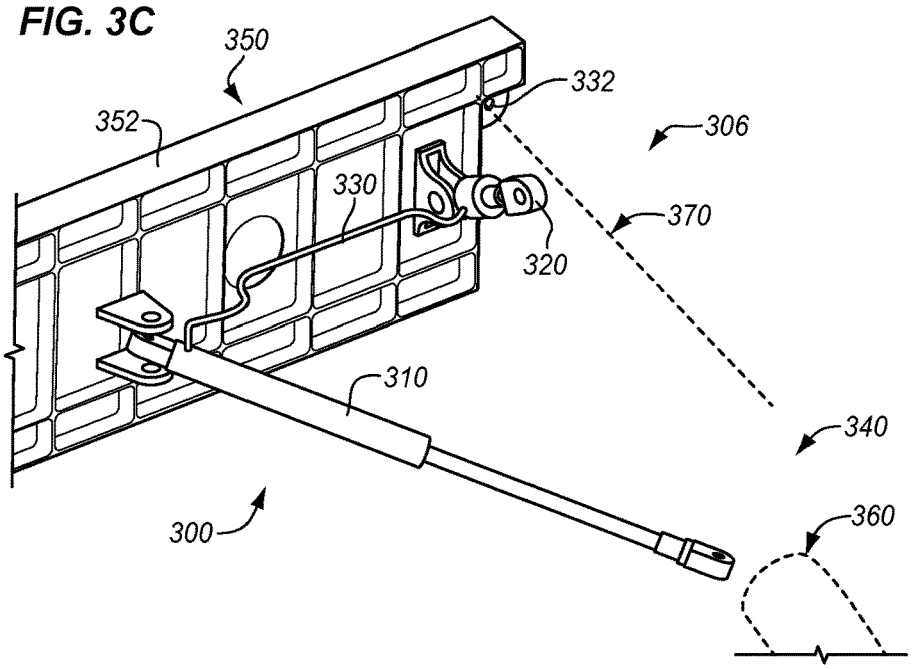
FIG. 3C illustrates a hydraulic droop panel system and the wing in a deployed position in an illustrative embodiment.

FIGS. 3A-3C illustrate a hydraulic droop panel system 300 for an aircraft wing 350 in an illustrative embodiment. FIG. 3A illustrates the hydraulic droop panel system 300 and the wing 350 in a stowed position 302 in an illustrative embodiment. FIG. 3B illustrates the hydraulic droop panel system 300 and the wing 350 in an intermediate position 304 in an illustrative embodiment. FIG. 3C illustrates the hydraulic droop panel system 300 and the wing 350 in a deployed position 306 in an illustrative embodiment.

The hydraulic droop panel system 300 addresses the above-described problems of the mechanical members 212-216 by transferring the motion of the flap to the droop panel via a closed hydraulic system instead of mechanical links. The hydraulic droop panel system 300 includes a first hydraulic actuator 310, a second hydraulic actuator 320, and a hydraulic fluid line 330 to fluidly couple the first hydraulic actuator 310 and the second hydraulic actuator 320. The first hydraulic actuator 310 is attached to a flap 360 and a wing support beam 352 of the aircraft wing 350. The second hydraulic actuator 320 is attached to a droop panel 370 and the wing support beam 352 of the aircraft wing 350. The wing support beam 352 (e.g., spoiler beam) is a fixed structural member of the aircraft wing 350 that generally extends in a direction of span of the aircraft wing 350.

As the flap 360 is driven (e.g., via drive mechanism 220 of the flight control system 150—not shown in FIGS. 3A-3C) from the stowed position 302 (shown in FIG. 3A) to the deployed position 306 (shown in FIG. 3C), the flap 360 pulls/extends the first hydraulic actuator 310. Hydraulic fluid is thus forced out of the first hydraulic actuator 310 and into the second hydraulic actuator 320 via the hydraulic fluid line 330. The second hydraulic actuator 320 retracts as hydraulic fluid enters into it, causing the droop panel 370 to rotate downwardly via a hinge 332. Thus, the hydraulic droop panel system 300 advantageously enables linked droop movement of the droop panel 370 and the flap 360 while eliminating the mechanical members 212-216 and their associated drawbacks.

In one embodiment, the droop panel 370 is a spoiler (e.g., spoiler 126) of an aircraft wing. In another embodiment, the flap 360 is a trailing edge flap (e.g., the trailing edge flap 140) of an aircraft wing. The aircraft wing 350 may include additional components not shown in FIGS. 3A-3C for sake of brevity. For instance, the flap 360 may include mechanical/hydraulic connections to the drive mechanism 220 and/or the flight control system 150 similar to that described in FIGS. 2A-2B or may include an alternative flap drive configuration. The relative position of the flap 360 and the droop panel 370 in the deployed position 306 may create a slot 340 therebetween for airflow through the wing 350 for takeoff and landing similar to that described above. FIGS. 3A-3C illustrate the droop panel 370 as a line showing its top surface (rather than its entire shape) for ease of illustration.

Figure 4:
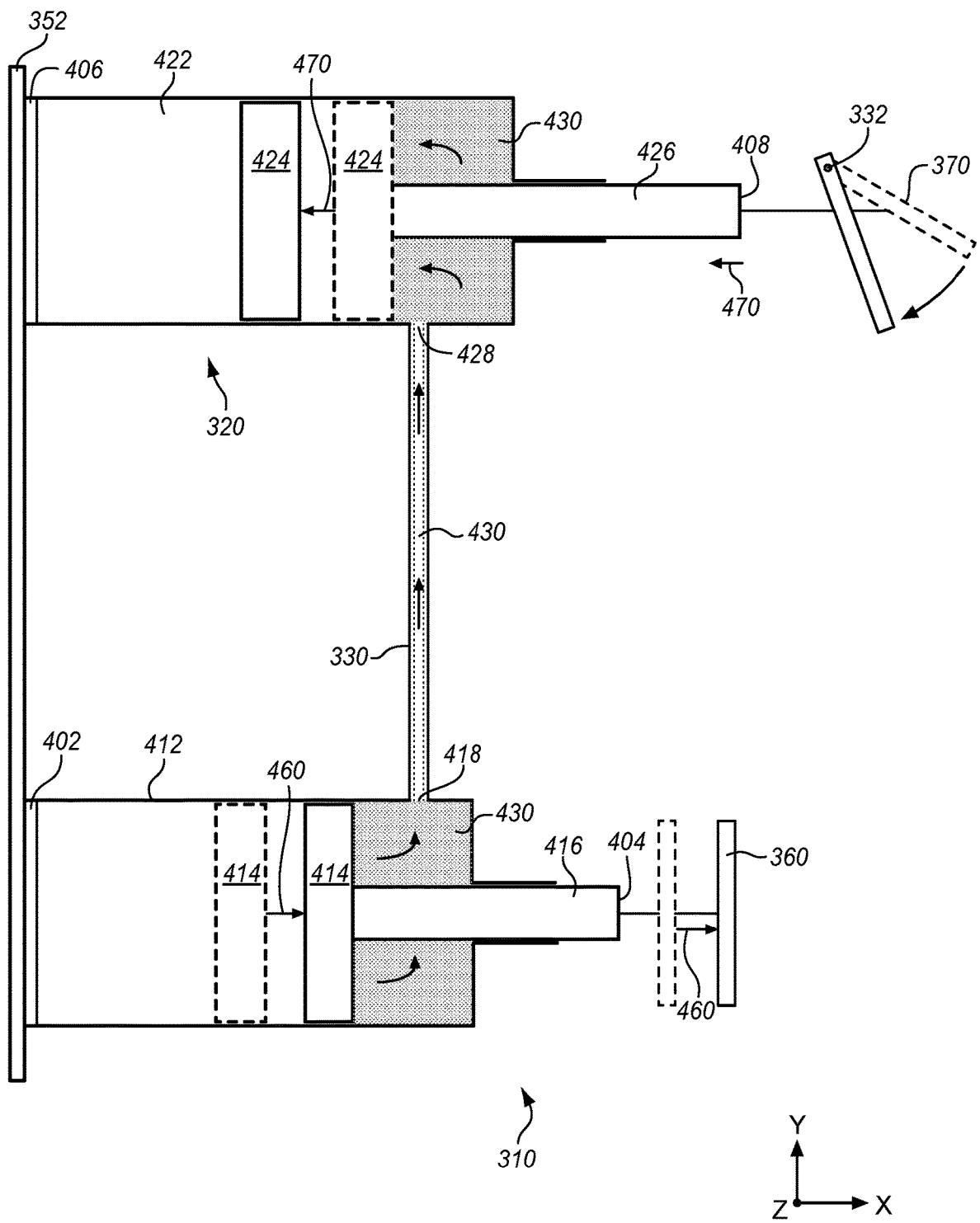
FIG. 4 is a schematic diagram of the hydraulic droop panel system in an illustrative embodiment.

FIG. 4 is a schematic diagram of the hydraulic droop panel system 300 in an illustrative embodiment. The first hydraulic actuator 310 includes a base end 402 attached to the wing support beam 352 and an actuator end 404 attached to the flap 360. The first hydraulic actuator 310 also includes a first chamber 412 (sometimes referred to as barrel or cylinder), a first piston 414, and a first piston rod 416. As the flap 360 extends outwardly, it pulls/extends the first piston rod 416 and the first piston 414 slides forward in the first chamber 412 to force hydraulic fluid 430 out of a first passage 418 of the first chamber 412 and into the hydraulic fluid line 330.

The second hydraulic actuator 320 includes a base end 406 attached to the wing support beam 352 and an actuator end 408 attached to the droop panel 370. The second hydraulic actuator 320 also includes a second chamber 422 (sometimes referred to as barrel or cylinder), a second piston 424, and a second piston rod 426. As the hydraulic fluid 430 is forced into a second passage 428 of the second chamber 422 from the hydraulic fluid line 330, the second piston 424 slides backward in the second chamber 422, thereby pulling/retracting the second piston rod 426 and causing the droop panel 370 to rotate downwardly via the hinge 332.

As shown by this example, first hydraulic actuator 310 and the second hydraulic actuator 320 may be fluidly coupled in a closed hydraulic circuit. That is, the hydraulic fluid between the first piston 414 and the second piston 424 (i.e., the hydraulic fluid in the first chamber 412, the hydraulic fluid line 330, and the second chamber 422) is maintained at a constant fluid pressure. Thus, the hydraulic droop panel system 300 advantageously enables movement of the flap 360 to impart a consistent corresponding movement in the droop panel 370.

The relative movement of the flap 360 and the droop panel 370 is defined by the relative difference in cross-sectional area of the first hydraulic actuator 310 and the second hydraulic actuator 320. For instance, the area of the first piston 414 (e.g., in the Y-Z plane) relative to the area of the second piston 424 (e.g., in the Y-Z plane) defines a first piston movement length 460 of the first hydraulic actuator 310 relative to a second piston movement length 470 of the second hydraulic actuator 320. Generally, the first hydraulic actuator 310 includes a smaller cross-sectional area than the second hydraulic actuator 320 such that the relatively large extension/retraction motion of the flap 360 (and thus relatively large first piston movement length 460 of the first piston 414) results in a relatively smaller second piston movement length 470 of the second hydraulic actuator 320 (and thus relatively small movement/rotation of the droop panel 370).

As such, motion of the flap 360 causes the first piston 414 to change in piston stroke position according to the first piston movement length 460. Since pressure is constant between the first hydraulic actuator 310 and the second hydraulic actuator 320, the change in piston stroke in the first piston 414 imparts a corresponding change in piston stroke in the second piston 424 according to the second piston movement length 470. Thus, as the flap 360 (and the first hydraulic actuator 310) extends to a deployed position, the second piston rod 426 retracts/pulls inward to rotate the droop panel 370 down to its deployed position. Similarly, as the flap 360 (and the first hydraulic actuator 310) retracts to a stowed position, the second piston rod 426 extends/pushes outward to rotate the droop panel 370 up to its stowed position.

Figure 5:
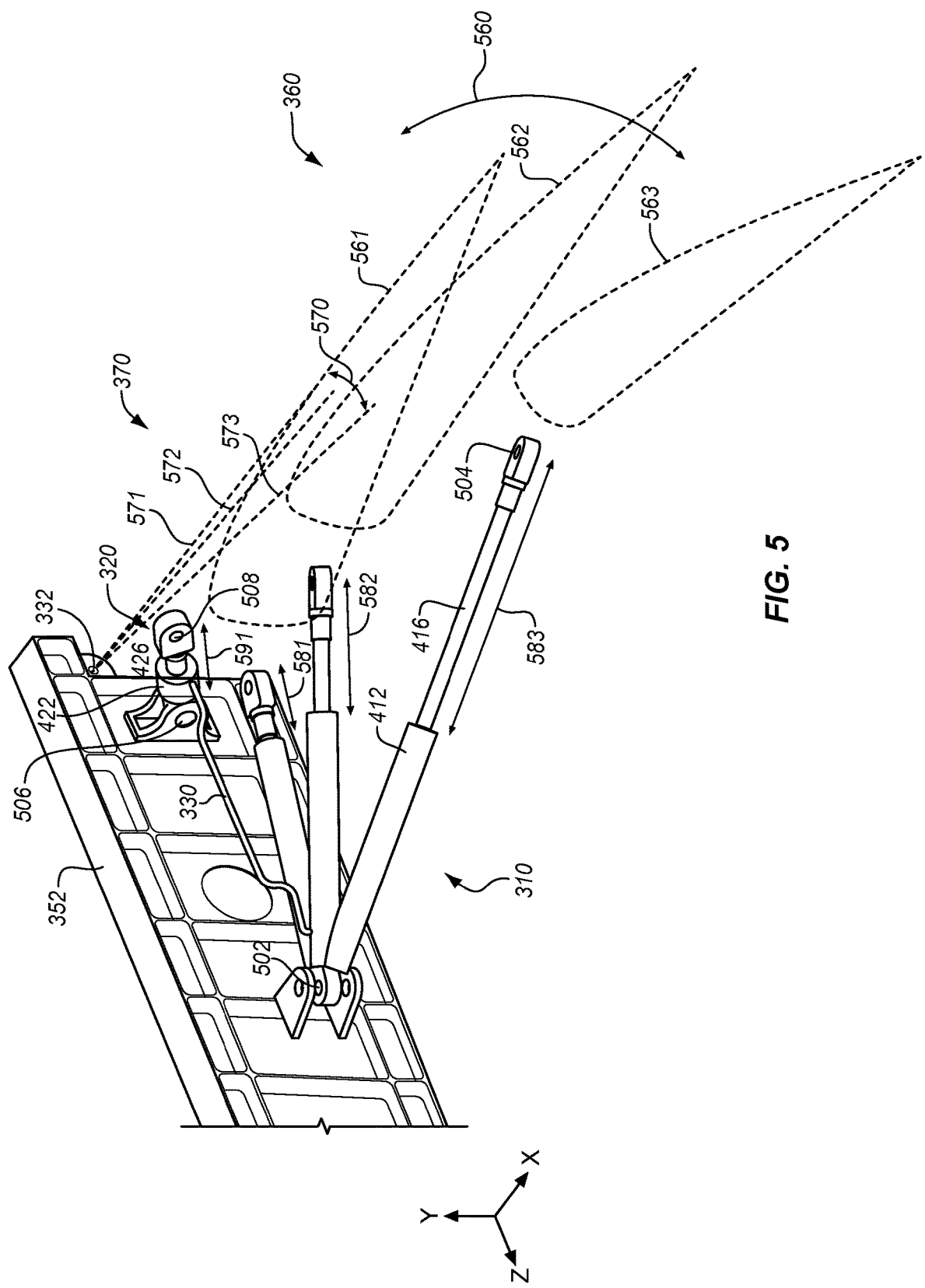
FIG. 5 illustrates the hydraulic droop panel system in another illustrative embodiment.

FIG. 5 illustrates the hydraulic droop panel system 300 in another illustrative embodiment. As shown in FIG. 5, the base end 402 of the first hydraulic actuator 310 may attach to the wing support beam 352 via a first joint 502 (e.g., spherical ball bearing) and the actuator end 404 may attach to the flap 360 via a second joint 504 (e.g., spherical ball bearing). Similarly, the base end 406 of the second hydraulic actuator 320 may attach to the wing support beam 352 via a third joint 506 (e.g., spherical ball bearing) and the actuator end 408 may attach to the droop panel 370 via a fourth joint (e.g., spherical ball bearing) 508.

As the flap 360 is driven in a sweeping motion 560 from a stowed position 561, an intermediate position 562, and a deployed position 563, the first piston rod 416 is extended/pulled out of the first chamber 412 for a first length 581, a second length 582, and a third length 583, respectively. The third length 583 is larger than the second length 582 which is larger than the first length 581. Additionally, as a result of the sweeping motion 560, the first hydraulic actuator 310 generally rotates about the first joint 502 to angle between the wing support beam 352 and the flap 360.

Actuation of the first hydraulic actuator 310 causes a corresponding actuation in the second hydraulic actuator 320 as described above. In particular, a length 591 of the second piston rod 426 is proportionally retracted into the second chamber 422 as a result of extending the first piston rod 416. As described earlier, absolute change in the length 591 of the second piston rod 426 is proportional to the absolute change in length of the first piston rod 416 from the first length 581 to the third length 583 according to the size difference proportion of the second hydraulic actuator 320 and the first hydraulic actuator 310.

As the second hydraulic actuator 320 retracts, the droop panel 370 rotates downward 570 (e.g., in the Y-direction) from a stowed position 571, to an intermediate position 572, and to a deployed position 573. The droop panel 370 rotates about the hinge 332 that rotatably attaches the droop panel 370 to the wing support beam 352 at or near an upper wing skin. Though just one length/position of the second hydraulic actuator 320 is shown in FIG. 5 for ease of illustration, it will be appreciated that the second hydraulic actuator 320 retracts correspondingly to extension of the first hydraulic actuator 310. Similarly, extension of the second hydraulic actuator 320 corresponds with retraction of the first hydraulic actuator 310. Since the hydraulic fluid line 330 provides constant fluid pressure between the first piston 414 and the second piston 424, the first piston rod 416 and the second piston rod 426 move in synchronized opposite directions. Additionally, though FIG. 5 shows just one intermediate position of the flap 360 and the droop panel 370, any number of positions between stowed and deployed positions are possible.

Figure 6:
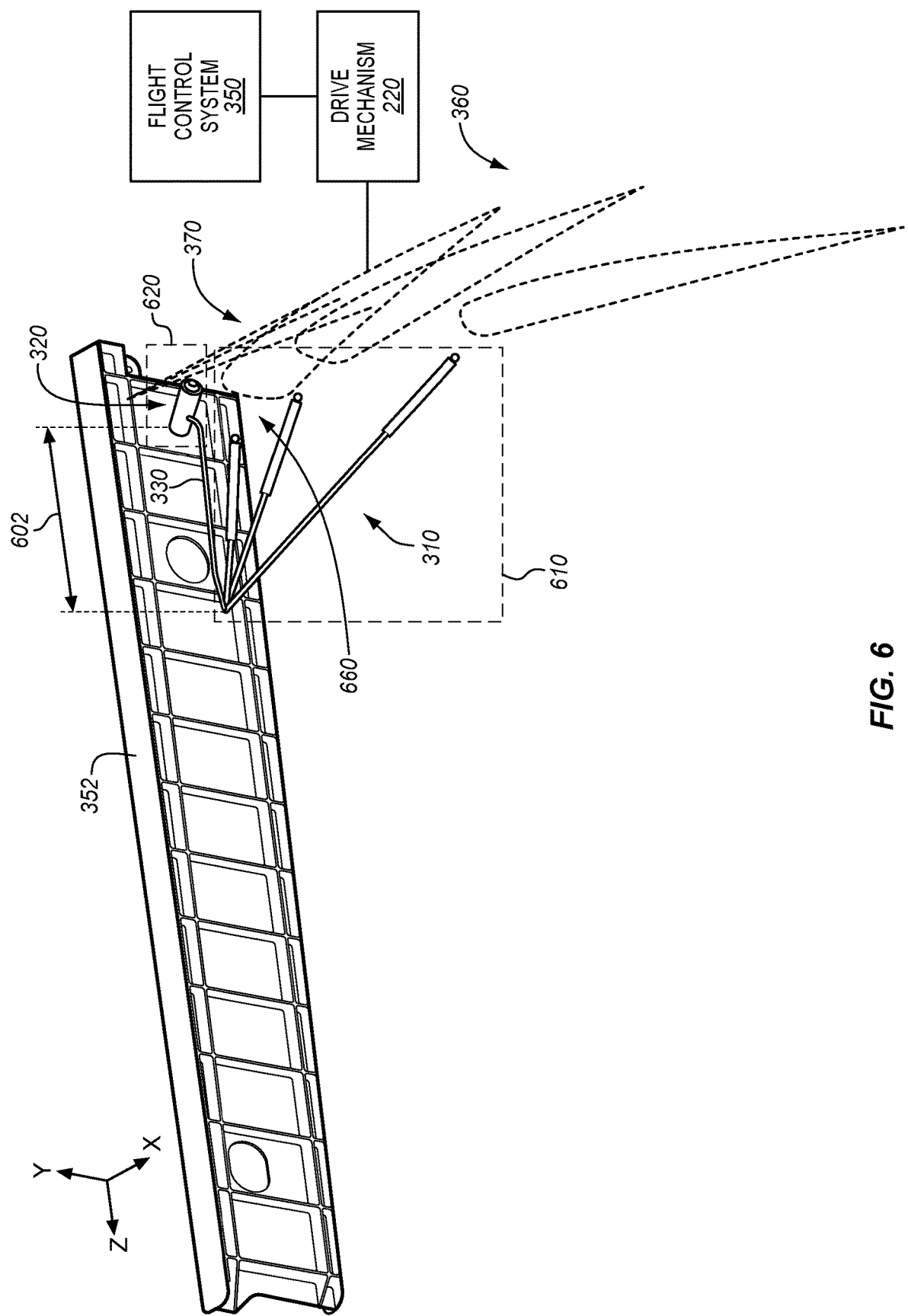
FIG. 6 illustrates the hydraulic droop panel system in yet another illustrative embodiment.

FIG. 6 illustrates the hydraulic droop panel system 300 in yet another illustrative embodiment. As shown in this example, the first hydraulic actuator 310 and the second hydraulic actuator 320 may be disposed a distance 602 from one another to reduce cove integration space 660 of the aircraft wing 350 and/or to reduce airflow blockage in a slot (e.g., the slot 340) between the flap 360 and the droop panel 370. For example, the first hydraulic actuator 310 may be located in a flap fairing space 610 that is spaced (e.g., in the Z-direction or along the span of the wing 350) away the second hydraulic actuator 320 and its droop deployment space 620. Thus, the hydraulic droop panel system 300 enables flexible configuration of the cove integration space 660 since its components can be spaced horizontally or at an angle along the length of the wing (rather than located vertically from one another as in the mechanical members 212-216 described in FIGS. 2A-2B).

Additionally, though the flap 360 may be controlled via the drive mechanism 220 (e.g., via a mechanical actuator) of the flight control system 150, the hydraulic droop panel system 300 may form a closed hydraulic system that does not fluidly couple with hydraulic components of the drive mechanism and/or the flight control system 150, thereby simplifying connections and components to maintain and facilitating easier failure detection through use of a pressure gauge to check for constant pressure in the hydraulic droop panel system 300. Alternatively or additionally, in some embodiments, the hydraulic droop panel system 300 may be connected to airplane systems to monitor health and perform calibrations.

Though a particular configuration of the hydraulic droop panel system 300 is shown and described for purposes of discussion, it will be appreciated that alternative components and arrangement of components is possible. Additionally, relative motion of the flap 360 and the droop panel 370 may vary by design choice based according to component lengths, component attachment locations, desired range of motions, and pressure ranges. Additionally, although just one length/position of the second hydraulic actuator 320 is shown in FIG. 6 for ease of illustration, it will be appreciated that the second hydraulic actuator 320 retracts correspondingly to extension of the first hydraulic actuator 310.

As earlier described, the pressure and geometric sizes of the first hydraulic actuator 310 and the second hydraulic actuator 320 may be configured to a desired range of motion of the flap 360 and the droop panel 370. For example, the hydraulic droop panel system 300 may be configured with a closed hydraulic pressure with a maximum of 3,000 pounds per square inch (psi), the first hydraulic actuator 310 may be configured with a radius of 0.25 inches, and the second hydraulic actuator 320 may be configured with a radius of 1 inch. Accordingly, in this example, the first hydraulic actuator 310 may extend from 13.6 inches in the stowed position to 35 inches in the deployed position, causing a corresponding retraction in the second hydraulic actuator 320 of 8.5 inches in the stowed position to 7.5 inches in the deployed position, and the 1 inch of retraction causes the droop panel 370 to rotate 12 degrees downward from the stowed to deployed position. Numerous variations are possible.

Figure 7:
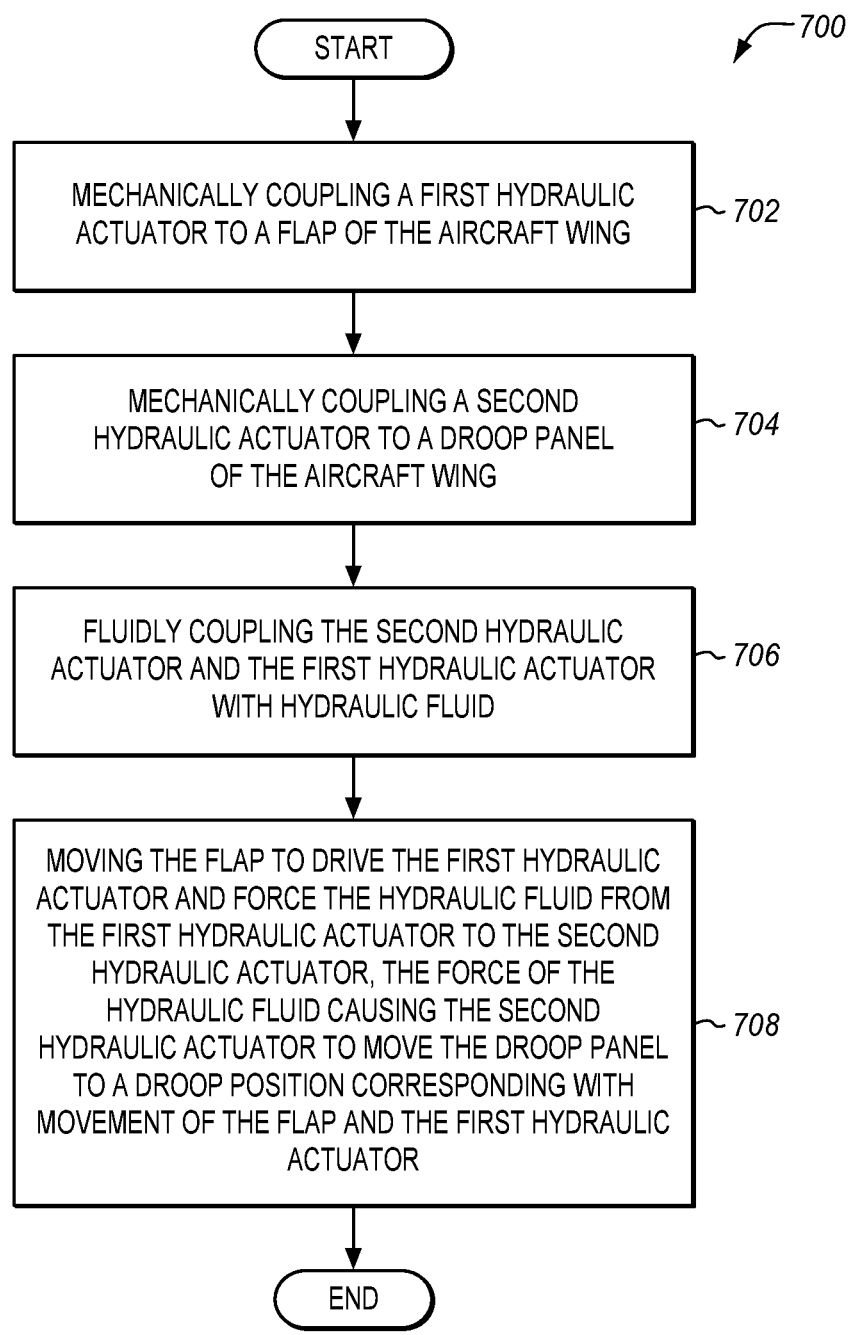
FIG. 7 is a flowchart of a method for controlling a droop position of an aircraft wing in an illustrative embodiment.

FIG. 7 is a flowchart of a method 700 for controlling a droop position of an aircraft wing in an illustrative embodiment. The steps of the method 700 will be described with reference to FIGS. 1-6, but those skilled in the art will appreciate that the method 700 may be performed in other systems. The steps of the flowchart(s) described herein are not all inclusive and may include other steps not shown. The steps described herein may also be performed in an alternative order.

In step 702, the first hydraulic actuator 310 is mechanically coupled to the flap 360 of the aircraft wing 350. In step 704, the second hydraulic actuator 320 is mechanically coupled to the droop panel 370 of the aircraft wing 350. In step 706, the second hydraulic actuator 320 and the first hydraulic actuator 310 are fluidly coupled with hydraulic fluid. In step 708, the flap 360 is moved to drive the first hydraulic actuator 310 and force the hydraulic fluid from the first hydraulic actuator 310 to the second hydraulic actuator 320, the force of the hydraulic fluid causing the second hydraulic actuator 320 to move the droop panel 370 to a droop position corresponding with movement of the flap 360 and the first hydraulic actuator 310.

Figure 8:
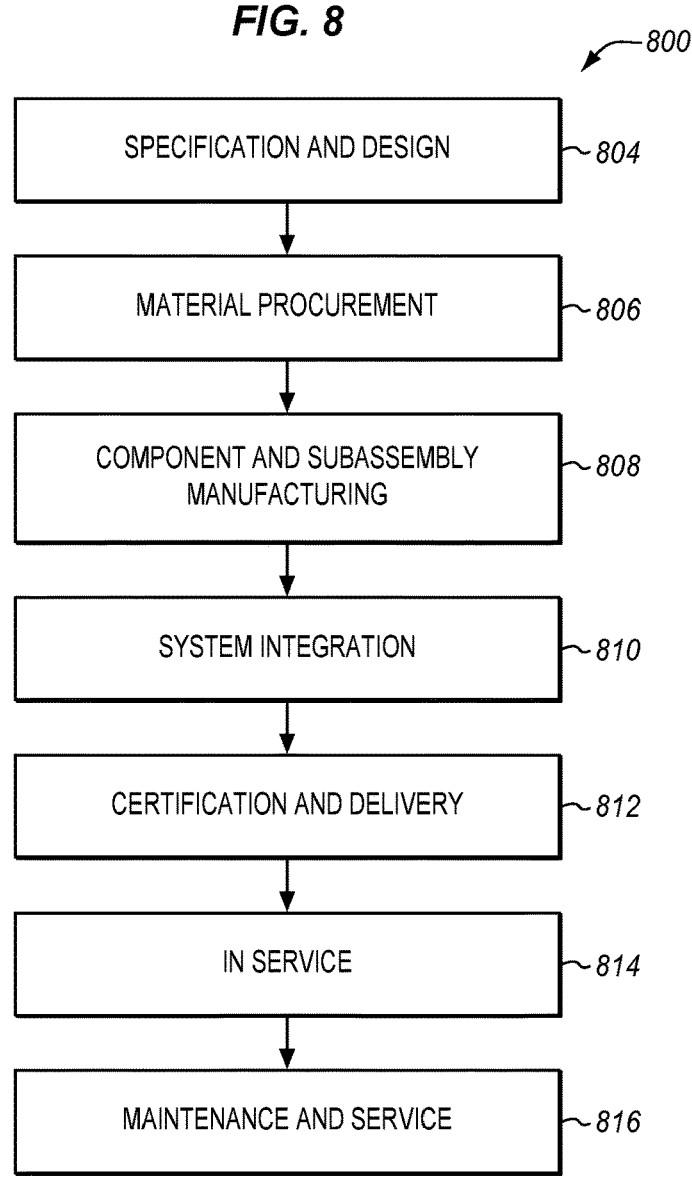
FIG. 8 is a flowchart illustrating an aircraft manufacturing and service method in an illustrative embodiment.
Figure 9:
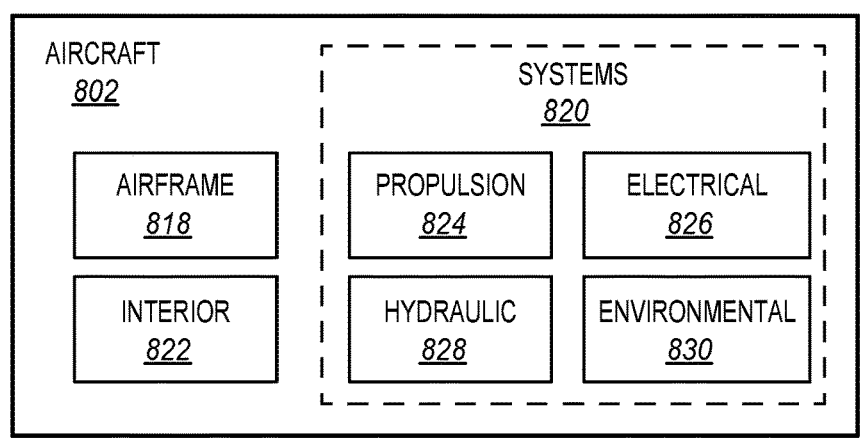
FIG. 9 is a block diagram of an aircraft in an illustrative embodiment.

FIG. 8 is a flowchart illustrating an aircraft manufacturing and service method 800 in an illustrative embodiment. FIG. 9 is a block diagram of an aircraft 802 in an illustrative embodiment. Embodiments of the disclosure may be described in the context of an aircraft manufacturing and service method 800 as shown in FIG. 8 and an aircraft 802 as shown in FIG. 9. During pre-production, illustrative method 800 may include specification and design 804 of the aircraft 802 and material procurement 806. During production, component and subassembly manufacturing 808 and system integration 810 of the aircraft 802 takes place. Thereafter, the aircraft 802 may go through certification and delivery 812 in order to be placed in service 814. While in service by a customer, the aircraft 802 is scheduled for routine maintenance and service 816 (which may also include modification, reconfiguration, refurbishment, and so on). Apparatus and methods embodied herein may be employed during any one or more suitable stages of the production and service method 800 (e.g., specification and design 804, material procurement 806, component and subassembly manufacturing 808, system integration 810, certification and delivery 812, service 814, maintenance and service 816) and/or any suitable component of aircraft 802 (e.g., airframe 818, systems 820, interior 822, propulsion 824, electrical 826, hydraulic 828, environmental 830).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 802 produced by illustrative method 800 may include an airframe 818 with a plurality of systems 820 and an interior 822. Examples of high-level systems 820 include one or more of a propulsion system 824, an electrical system 826, a hydraulic system 828, and an environmental system 830. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 800. For example, components or subassemblies corresponding to production stage 808 may be fabricated or manufactured in a manner similar to components or subassemblies produced while the aircraft 802 is in service. Also, one or more apparatus embodiments, method embodiments, or a combination thereof may be utilized during the production stages 808 and 810, for example, by substantially expediting assembly of or reducing the cost of an aircraft 802. Similarly, one or more of apparatus embodiments, method embodiments, or a combination thereof may be utilized while the aircraft 802 is in service, for example and without limitation, to maintenance and service 816. For example, the techniques and systems described herein may be used for steps 806, 808, 810, 814, and/or 816, and/or may be used for airframe 818 and/or interior 822. These techniques and systems may even be utilized for systems 820, including for example propulsion 824, electrical 826, hydraulic 828, and/or environmental 830.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof

What is claimed is:

1. A hydraulic droop panel system for an aircraft wing, the hydraulic droop panel system comprising:
a first hydraulic actuator attached to a flap of the aircraft wing, the first hydraulic actuator driven by a pulling force of the flap as the flap moves from a retracted position to a deployed position; and
a second hydraulic actuator attached to a droop panel of the aircraft wing, and fluidly coupled with the first hydraulic actuator, the second hydraulic actuator configured to transfer the pulling force of the flap into a downward rotation of move the droop panel to a droop position.

2. The hydraulic droop panel system of claim 1 wherein:
the first hydraulic actuator and the second hydraulic actuator are fluidly coupled via a hydraulic fluid line with a fluid pressure in a closed hydraulic circuit.

3. The hydraulic droop panel system of claim 1 wherein:
the first hydraulic actuator includes a first piston and first piston rod mechanically coupled to the flap of the aircraft wing; and
the second hydraulic actuator includes a second piston and second piston rod mechanically coupled to the droop panel of the aircraft wing.

4. The hydraulic droop panel system of claim 3 wherein:
as the first piston rod is pulled via pilot-controlled extension of the flap, the second piston rod retracts to rotate the droop panel downwards.

5. The hydraulic droop panel system of claim 1 wherein:
the movement of the flap is controlled by an aircraft flight control system; and
the first hydraulic actuator and the second hydraulic actuator operate independently of hydraulics of the aircraft flight control system.

6. The hydraulic droop panel system of claim 1 wherein:
the droop panel is a spoiler of the aircraft wing, and
the flap is a trailing edge flap of the aircraft wing.

7. The hydraulic droop panel system of claim 1 wherein:
the first hydraulic actuator includes a first end attached to a wing support beam of the aircraft wing, and a second end attached to the flap of the aircraft wing,
the second hydraulic actuator includes a first end attached to the wing support beam of the aircraft wing, and a second end attached to the droop panel of the aircraft wing, and
in response to movement of the flap relative to the wing support beam, the first hydraulic actuator transfers fluid to the second hydraulic actuator to rotate the droop panel downward relative to the wing support beam.

8. A method for controlling a droop position of an aircraft wing, the method comprising:
mechanically coupling a first hydraulic actuator to a flap of the aircraft wing, the first hydraulic actuator driven by a pulling force of the flap as the flap moves from a retracted position to a deployed position;
mechanically coupling a second hydraulic actuator to a droop panel of the aircraft wing;
fluidly coupling the second hydraulic actuator and the first hydraulic actuator with hydraulic fluid; and
transferring the pulling force of the flap into a downward rotation of the droop panel to a droop position via the hydraulic fluid, the first hydraulic actuator, and the second hydraulic actuator.

9. The method of claim 8 further comprising:
fluidly coupling the second hydraulic actuator and the first hydraulic actuator in a closed hydraulic circuit.

10. The method of claim 8 further comprising:
mechanically coupling an actuator end of the first hydraulic actuator to the flap via a spherical ball bearing.

11. The method of claim 10 further comprising:
mechanically coupling a base end of the first hydraulic actuator to a wing support beam via a spherical ball bearing.

12. The method of claim 11 further comprising:
mechanically coupling the base end of the first hydraulic actuator in a flap fairing of the aircraft wing.

13. The method of claim 11 further comprising:
mechanically coupling the base end of the second hydraulic actuator at a horizontal distance from the base end of the first hydraulic actuator in a direction along a span of the aircraft wing.

14. The method of claim 11 further comprising:
mechanically coupling an actuator end of the second hydraulic actuator to the droop panel.

15. A wing of an aircraft, the wing comprising:
a flap configured to move via a mechanical actuator from a retracted position to a deployed position;
a spoiler; and
a hydraulic linkage between the flap and the spoiler, configured to transfer a pulling force of the flap as the flap moves from the retracted position to the deployed position into a downward rotation of the spoiler about a hinge.

16. The wing of claim 15 further comprising:
a wing support beam,
wherein the hydraulic linkage includes a first hydraulic actuator attached to the wing support beam and the flap, a second hydraulic actuator attached to the wing support beam and the spoiler, and a fluid line to fluidly couple the first hydraulic actuator and the second hydraulic actuator, and
wherein the spoiler rotates about a hinge on the wing support beam.

17. The wing of claim 16 wherein:
wherein the second hydraulic actuator is configured to move the spoiler to a droop position corresponding to movement of the flap via hydraulic fluid forced between the second hydraulic actuator and the first hydraulic actuator as the first hydraulic actuator is actuated by the mechanical actuator.

18. The wing of claim 16 wherein:
the fluid line fluidly couples a first piston of the first hydraulic actuator with a second piston of the second hydraulic actuator in a closed hydraulic circuit.

19. The wing of claim 16 wherein:
a change in stroke position of the first hydraulic actuator via pilot-controlled movement of the flap imparts a corresponding change in stroke position of the second hydraulic actuator via hydraulic fluid in the fluid line.

20. The wing of claim 19 further comprising:
the corresponding change in stroke position of the second hydraulic actuator pulls the second hydraulic actuator inward to rotate the spoiler downward to a deployed droop position.

* * * * *